(12) United States Patent
Farrell

(10) Patent No.: US 6,615,978 B1
(45) Date of Patent: Sep. 9, 2003

(54) ENDLESS CONVEYOR BELT AND SPLICING MEMBER FOR FORMING SAME

(75) Inventor: Glenn Peter Farrell, Landisville, PA (US)

(73) Assignee: Lumsden Flexx Flow, Inc., Lancaster, PA (US)

(*) Notice: Subject to any disclaimer, the term of this patent is extended or adjusted under 35 U.S.C. 154(b) by 0 days.

(21) Appl. No.: 10/187,334

(22) Filed: Jul. 2, 2002

(51) Int. Cl.$^7$ .............................................. B65G 15/54
(52) U.S. Cl. ...................................................... 198/848
(58) Field of Search .............................. 198/844.2, 848, 198/850, 853

(56) References Cited

U.S. PATENT DOCUMENTS

| | | | | |
|---|---|---|---|---|
| 2,633,228 A | * | 3/1953 | Potts | 198/848 |
| 2,904,165 A | * | 9/1959 | Look | 198/848 |
| 3,339,712 A | * | 9/1967 | Anderson | 198/848 X |
| 4,754,871 A | * | 7/1988 | Gustafson | 198/848 |
| 6,102,196 A | * | 8/2000 | Domit, Jr. | 198/848 |

OTHER PUBLICATIONS

"Splicing the FLEXX FLOW Belt," Lumsden Corporation.
"Lumsden FLEXX FLOW Inc., Technical Guidline Brocure," pp. 1 to 7.

* cited by examiner

Primary Examiner—James R. Bidwell
(74) Attorney, Agent, or Firm—Merek, Voorhees & Voorhees, LLC

(57) ABSTRACT

An endless conveyor belt comprising a plurality of interconnected segments forming a conveying surface to convey at least one article from one point to another. The conveying surface preferably has first and seconds ends and a plurality of openings. A splicing member preferably connects the first end of the conveying surface to the second end of the conveying surface to form an endless conveyor belt. The splicing member preferably includes at least first and second sections, a connecting member and at least one sealing member. The connecting member has first and second ends. A portion of the first section is connected to the first end of the connecting member thereby forming a first exposed area. A portion of the second section is connected to the second end of the connecting member thereby forming a second exposed area. The at least one sealing member is deposed relative to the connecting member and the first and second sections to seal at least one of the first and second exposed areas.

21 Claims, 3 Drawing Sheets

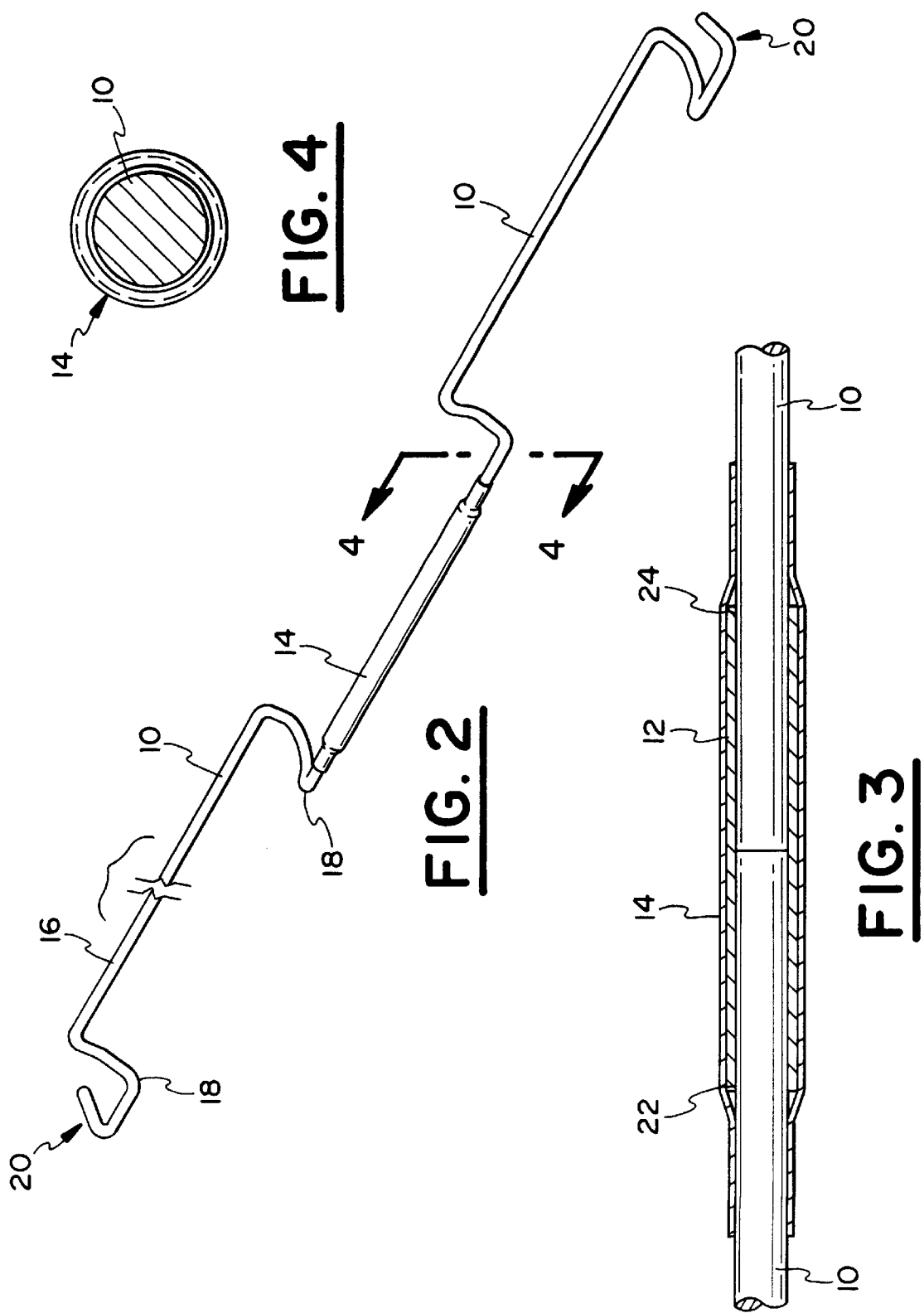

ENDLESS CONVEYOR BELT AND SPLICING MEMBER FOR FORMING SAME

FIELD OF THE INVENTION

The present invention is directed to devices used to convey objects from one location to another. In its most preferred form, the present invention is directed to an endless conveyor belt and a splicing member for forming the endless conveyor belt.

BACKGROUND OF THE INVENTION

Endless conveyor belts have been widely used to transport a number of different objects from one location to another. For example, endless conveyor belts have been used in the food processing industry to transport food products such as poultry, seafood, vegetables, cookies, crackers, bagels, tortillas and red meat. Typical food processes in which endless conveyor belts have been used include breading, battering, forming, frying, cooking, coating and baking. Endless conveyor belts have also been used in the food service industry to transport food products such as pizza, seafood, lunchmeat and toast. Endless conveyor belts can be found in this industry in impingement ovens in retail outlets, retail toasters and meat slicing systems to name a few. Further, endless conveyor belts have been used to transport confectionary food products including chocolate coatings and sugar coatings. Endless conveyor belts have also been used in the automotive industry, textile industry and electronics industry to transport various objects from one location to another.

One prior art endless conveyor belt that has been used in a wide variety of applications is the FLEXX FLOW endless belt manufactured by Lumsden Flexx Flow, Inc. While the FLEXX FLOW endless conveyor belt has been widely accepted by a number of different industries, it has some drawbacks as explained in detail hereinafter. The FLEXX FLOW endless conveyor belt includes a plurality of interconnected wire segments that form a conveying surface to transport various objects from one location to another. The conveying surface has first and second ends that are connected together by a single splice wire. In the field, it is very difficult to connect the first and second ends of the conveying surface using the single splice wire. Currently, the single splice wire is woven through the first and second ends to connect the same to form an endless conveyor belt. This process is extremely difficult and time consuming. Further, on occasion, the splicing wire is so distorted in the weaving process that the belt no longer works or breaks prematurely.

As an alternative to the single splice wire, a multiple segment splicing element has been used. This previously known multiple segment splicing element includes a plurality of wire sections and a plurality of stainless steel hollow tubes. The wire sections are woven into the first and second ends of the conveying surface and inserted into adjacent ends of the hollow tube to connect portions of the first end to the second end of the conveying surface. The ends of the hollow tube are crimped or otherwise squeezed to secure the adjoining wire sections. While this process of splicing to form an endless conveyor belt is somewhat easier than the single splice wire technique, it suffers from significant drawbacks. First, after a period of use, the hollow stainless steel tubes can become dislodged and fall off the endless belt. This is undesirable because the integrity of the endless belt is compromised and the hollow connecting tube can become embedded in the food products or other article being carried. Further, the crimping process creates a gap between the hollow tube and the adjoining wire sections. Bacteria can readily lodge in the gaps formed during the crimping process. This is extremely undesirable when, for example, food products are being transported. The USDA will not allow the use of the hollow stainless steel tubes because bacteria can readily form in the gaps.

While it has been known to use sealing members formed from plastic to seal, for example, electrical wiring splices, it has not previously been known how to overcome the significant drawbacks of the stainless steel tube splicing system used in endless conveyor belts.

OBJECTS AND SUMMARY OF THE INVENTION

An object of the preferred embodiment of the present invention is to provide a novel and unobvious endless conveyor belt and splicing member for forming the endless conveyor belt.

Another object of a preferred embodiment of the present invention is to provide an endless conveyor belt that can be readily formed in the field.

A further object of a preferred embodiment of the present invention is to provide an endless conveyor belt that can be readily formed free of gaps or space in which bacteria can lodge.

Still a further object of a preferred embodiment of the present invention is to provide an endless conveyor belt that can be used for prolonged periods of time without the structural integrity becoming compromised.

Yet still a further object of a preferred embodiment of the present invention is to provide a splicing member that can be used in the filed by a relatively unskilled laborer to readily form an endless belt.

Another object of a preferred embodiment of the present invention is to provide a splicing member that can readily form an endless belt without distorting any component of the splicing member or the conveyor.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to an endless conveyor belt comprising a plurality of interconnected wire segments forming a conveying surface to convey at least one article from one point to another. The conveying surface includes first and seconds ends and a plurality of openings. A splicing member connects the first end of the conveying surface to the second end of the conveying surface to form an endless conveyor belt. The splicing member includes at least first and second wire sections, a hollow connecting tube and at least one sealing member. The hollow connecting tube has first and second ends. A portion of the first wire section is inserted in the first end of the hollow connecting tube thereby forming a first exposed area. A portion of the second wire section is inserted into the second end of the hollow connecting tube thereby forming a second exposed area. The at least one sealing member is deposed relative to the hollow connecting tube and the first and second wire sections to seal at least one of the first and second exposed areas.

Another embodiment of the present invention is directed to a splicing member for forming an endless conveyor belt. The splicing member comprises at least first and second wire sections. The splicing member further includes at least one hollow connecting tube having first and second ends. The first end of the hollow connecting tube is adapted to receive a portion of the first wire section thereby forming a first exposed area. The second end of the hollow connecting tube is adapted to receive a portion of the second wire section thereby forming a second exposed area. At least one sealing member is adapted to seal at least one of the first and second exposed areas.

A further embodiment of the present invention is directed to an endless conveyor belt for conveying a food product from one point to another. The endless belt comprises a plurality of interconnected wire segments forming a conveying surface to convey a food product from one point to another. The conveying surface has first and seconds ends and a plurality of openings. A splicing member connects the first end of the conveying surface to the second end of the conveying surface to form an endless conveyor belt. The splicing member includes at least first and second wire sections, a hollow connecting tube and at least one sealing member. The hollow connecting tube has first and second ends. A portion of the first wire section is inserted into the first end of the hollow connecting tube forming a first exposed area. A portion of the second wire section is inserted into the second end of the hollow connecting tube forming a second exposed area. The at least one sealing member is hollow and has first and second ends. The sealing member has a length greater than the hollow connecting tube. The hollow connecting tube is inserted into the sealing member. The first end of the sealing member is heat sealed to the first wire section adjacent the first exposed area to seal the first exposed area. The second end of the sealing member is heat sealed to the second wire section adjacent the second exposed area to seal the second exposed area.

Still another embodiment of the present invention is directed to an endless conveyor belt comprising a plurality of interconnected segments forming a conveying surface to convey at least one article from one point to another. The conveying surface has first and seconds ends and a plurality of openings. A splicing member connects the first end of the conveying surface to the second end of the conveying surface to form an endless conveyor belt. The splicing member includes at least first and second sections, a connecting member and at least one sealing member. The connecting member has first and second ends. A portion of the first section is connected to the first end of the connecting member thereby forming a first exposed area. A portion of the second section is connected to the second end of the connecting member thereby forming a second exposed area. The at least one sealing member is deposed relative to the connecting member and the first and second sections to seal at least one of the first and second exposed areas.

BRIEF DESCRIPTION OF THE DRAWINGS

FIG. 2 is a fragmentary perspective view of a splicing member formed in accordance with the most preferred embodiment of the present invention.

FIG. 3 is a cross-sectional view of a portion of a splicing member formed in accordance with the most preferred embodiment of the present invention.

FIG. 4 is a cross-sectional view taken along lines 4—4 in FIG. 2.

DETAILED DESCRIPTION OF THE PREFERRED EMBODIMENT OF THE INVENTION

The most preferred form of the invention will now be described with reference to FIGS. 1–5. The appended claims are not limited to the most preferred embodiment and no term used herein is to be given a meaning other than its ordinary meaning unless accompanied by a statement that the term "as used herein is defined as follows".

FIGS. 1 THROUGH 5

Figure 1:
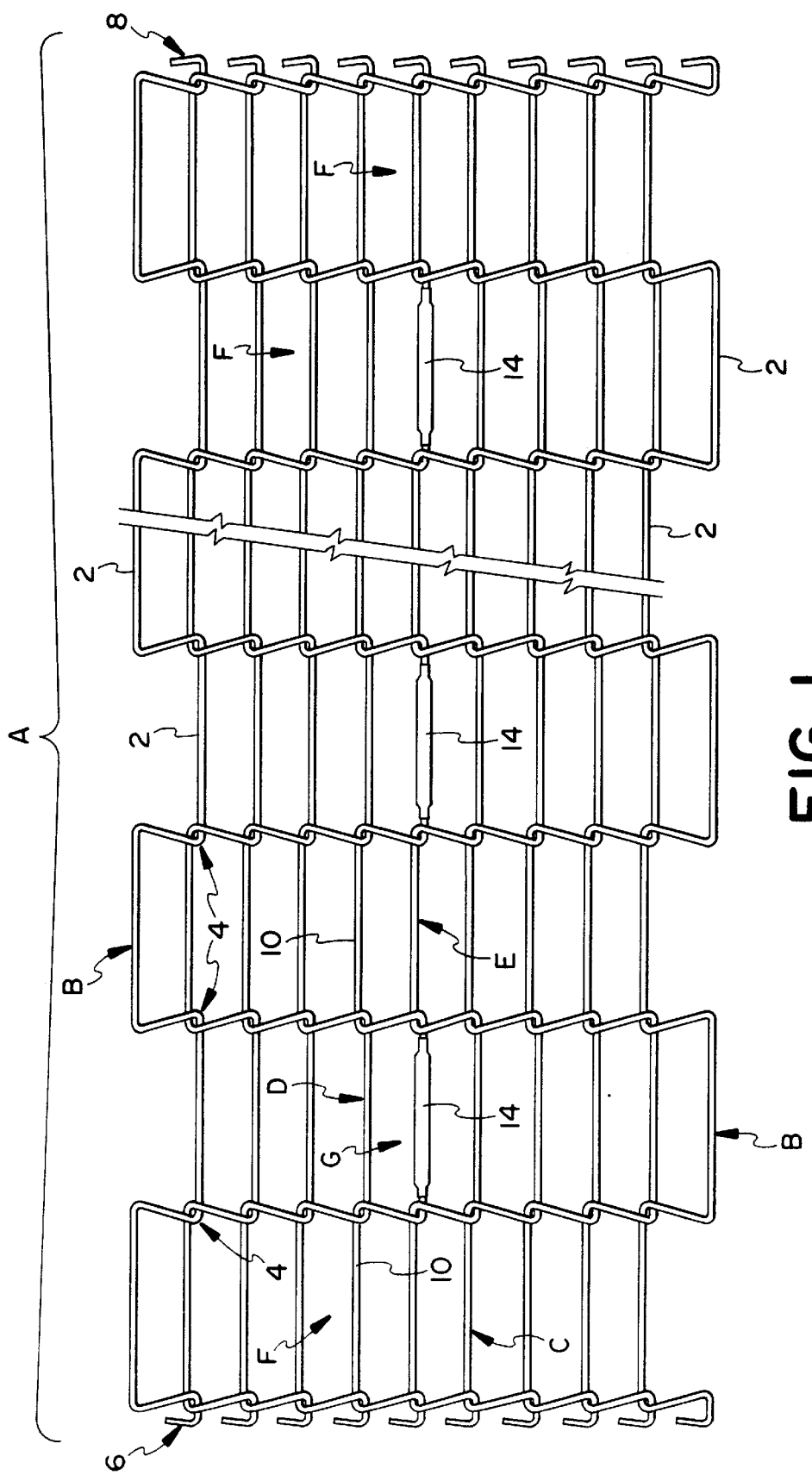
FIG. 1 is a fragmentary elevation view of a portion of an endless conveyor belt formed in accordance with the most preferred embodiment of the present invention.
Figure 5:
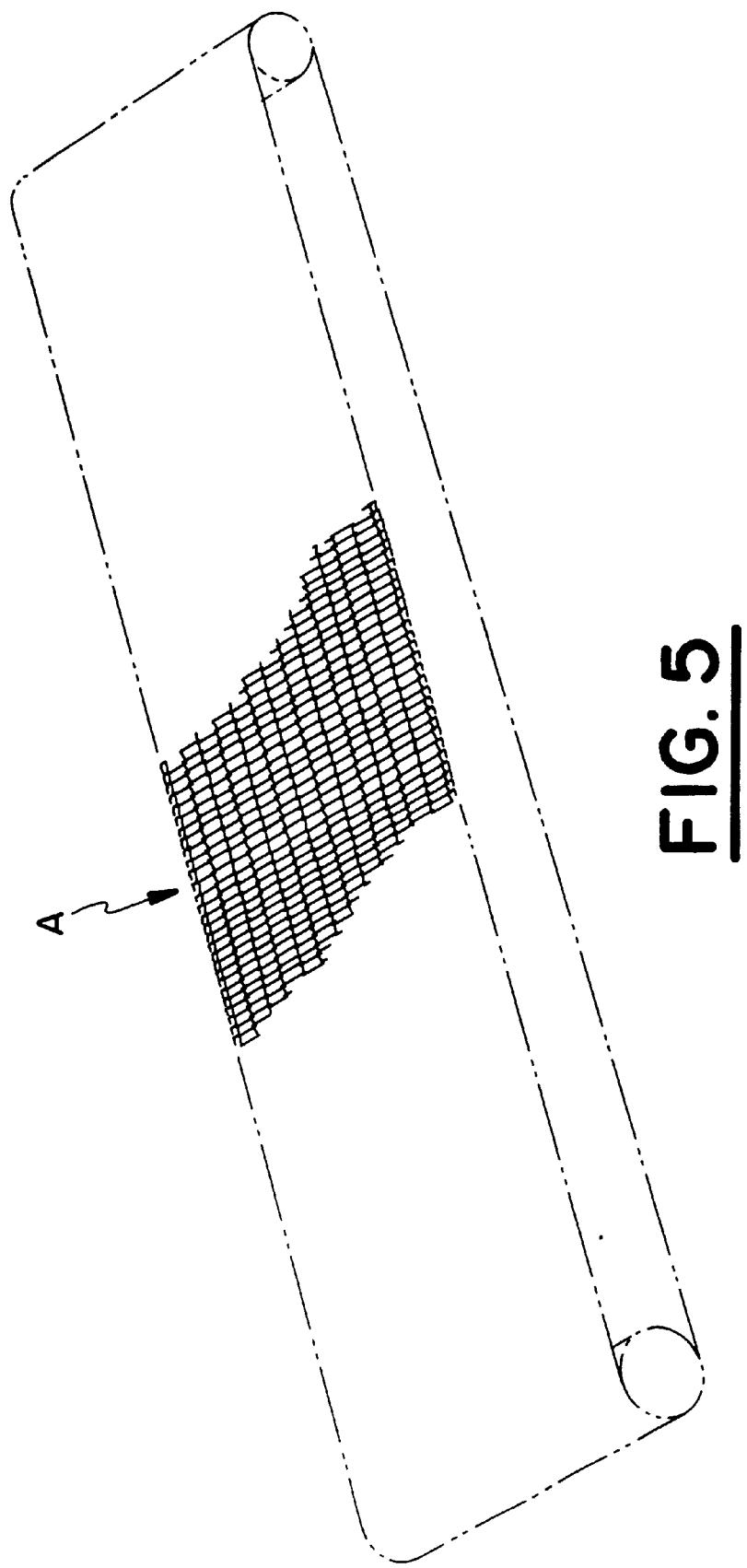
FIG. 5 is a fragmentary perspective view of one of many possible configurations for an endless conveyor belt.

Referring to FIG. 5, an endless belt A is illustrated in one of many possible configurations. The details of the endless belt A are shown in FIGS. 1 to 4. Referring to FIG. 1, the endless belt A includes a plurality of interconnected wire segments B forming a conveying surface C for conveying an object or article form one point to another. Conveying surface C includes a first end D and a second end E and a plurality of openings F. The size of opening F will vary with the pitch and diameter of the wire segments B. Frequently used pitch and diameters for wire segments B include the following: (1) ⅛"×0.050"; (2) ¼"×0.050"; (3) ⅜"×0.050"; (4) ⅜"×0.062"; (5) ⅜"×0.082"; (6) ½"×0.072"; and, (7) ½"×0.092". However, it will be readily understood that the pitch and diameter of wire segments B can be readily varied to suit the particular application.

Preferably, the wire segments B include a plurality of spans 2 and z-bends 4. The wire segments B further include a first edge 6 and a second edge 8. First edge 6 and second edge 8 are preferably formed as substantially U-shaped elements. The wire segments B are preferably formed from high tensile 302 stainless steel wire. However, it will be readily appreciated that the configuration and material of the wire segments B may be varied.

The first end D of the conveying surface C is connected to the second end E by a splicing member G. Referring to FIGS. 1 through 4, the splicing member G preferably includes a plurality of wires sections 10, a plurality of hollow stainless steel connecting tubes 12 and a plurality of sealing members 14. The number of wire sections 10, connecting tubes 12 and sealing members 14 will vary depending upon the width of the endless conveyor belt A. Preferably, the wire sections 10 have at least one span 16 and at least two z-bends 18 and are formed from high tensile 302 stainless steel. The wire sections 10 disposed at each side of the endless conveyor belt A preferably have a substantially U-shaped edge 20 similar to the first and second edges 6 and 8 of wire segments B depicted in FIG. 1. It will be readily appreciated that the configuration and material of the wire sections 10 may be readily varied.

As best seen in FIG. 3, the hollow stainless steel tubes 12 each have first and seconds open ends 22 and 24, respectively for receiving adjacent wire sections 10. Preferably, the adjoining wire sections 10 abut each other inside of the hollow connecting tube 12. However, it will be readily appreciated that adjoining wire sections 10 may be spaced from each other inside of the hollow connecting tube 12. The hollow connecting tube 12 is preferably connected to adjacent wire sections 10 by crimping or squeezing the ends of the hollow connecting tube 12. This typically results in a gap being formed between the wire section 10 and the hollow connecting tube 12 adjacent the portion of the hollow connecting tube 12 that has been crimped. It will be readily appreciated that the hollow connecting tube 12 may be connected to the adjacent wire sections 10 by any conventional means.

Referring to FIGS. 1 to 3, sealing member 14 is preferably hollow and formed from a plastic that when heated will shrink to adhere to adjacent wire sections 10 to seal the gaps formed when securing the hollow connecting tube 12 to the adjacent wire sections 10. The sealing member 14 preferably has a length greater than the hollow connecting tube 12 so that the hollow connecting tube 12 is disposed entirely within the sealing member 14. In this manner, one sealing member can be used to seal both gaps formed in securing the hollow connecting tube 12 to the adjacent wire sections 10. Alternatively, two smaller sealing members may be used to seal the gaps. Preferably, the ends 26 and 28 of the sealing member 14 are heat sealed to the adjacent wire section 10. The term "heat sealed" as used herein is defined as follows: a process in which an element or member is exposed to a sufficient temperature change to cause the element to expand or contract to seal to another element or member.

Preferably, the sealing member 14 is omitted from the spans directly adjacent the sides of the endless conveyor belt A. Further, it should be noted that while the sealing member A is depicted on every other span in FIG. 1, it will be readily appreciated that the frequency of the sealing members 14 may be varied. For example, instead of every other span the sealing members 14 may be disposed on every span.

The sealing member 14 of the most preferred embodiment seals the gaps formed about the ends of the hollow connecting tube 12 and prevents the hollow connecting tube 12 from becoming dislodged from the adjacent wire sections 10.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

I claim:

1. An endless conveyor belt, comprising:
   (a) a plurality of interconnected wire segments forming a conveying surface to convey at least one article from one point to another, said conveying surface having first and seconds ends and a plurality of openings;
   (b) a splicing member for connecting said first end of said conveying surface to said second end of said conveying surface to form an endless conveyor belt; and,
   (c) said splicing member including at least first and second wire sections, a hollow connecting tube and at least one sealing member, said hollow connecting tube having first and second ends, a portion of said first wire section being inserted into said first end of said hollow connecting tube thereby forming a first exposed area, a portion of said second wire section being inserted into said second end of said hollow connecting tube thereby forming a second exposed area, said at least one sealing member being deposed relative to said hollow connecting tube and said first and second wire sections to seal at least one of said first and second exposed areas.

2. An endless conveyor belt as recited in claim 1, wherein:
   (a) said sealing member seals both of said first and second exposed areas.

3. An endless conveyor belt as recited in claim 1, wherein:
   (a) said sealing member is a hollow plastic tube having a length greater than said hollow connecting tube.

4. An endless conveyor belt as recited in claim 3, wherein:
   (a) said hollow connecting tube is formed from stainless steel and is disposed entirely within said sealing member.

5. An endless conveyor belt as recited in claim 4, wherein:
   (a) said hollow plastic tube has first and second ends, said first end of said hollow plastic tube is heat sealed to said first wire section to seal said first exposed area, said second end of said hollow plastic tube is heat sealed to said second wire section to seal said second exposed area.

6. An endless belt as recited in claim 1, wherein:
   (a) said splicing member includes a plurality of sealing members.

7. An endless belt as recited in claim 1, wherein:
   (a) said first and second wire segments include a first edge, a second edge, a plurality of z-bends and a plurality of spans, said plurality of z-bends and said plurality of spans being positioned between said first edge and said second edge.

8. An endless belt as recited in claim 7, wherein:
   (a) said plurality of spans include a first span disposed adjacent said first edge and a second span disposed adjacent said second edge, said first and second spans are free from sealing elements.

9. An endless belt as recited in claim 7, wherein:
   (a) said plurality of spans include a first span disposed adjacent said first edge, a second span disposed adjacent said second edge, at least one intermediate span positioned between said first and second spans, said sealing member being disposed on said intermediate span.

10. A splicing member for forming an endless conveyor belt, said splicing member, comprising:
    (a) at least first and second wire sections;
    (b) at least one hollow connecting tube having first and second ends, said first end of said hollow connecting tube being adapted to receive a portion of said first wire section thereby forming a first exposed area, said second end of said hollow connecting tube being adapted to receive a portion of said second wire section thereby forming a second exposed area; and,
    (c) at least one sealing member being adapted to seal at least one of said first and second exposed areas.

11. A splicing member as recited in claim 10, wherein:
    (a) said hollow connecting tube is formed from stainless steel.

12. A splicing member as recited in claim 11, wherein:
    (a) said sealing member is a hollow plastic tube.

13. A splicing member as recited in claim 12, wherein:
    (a) said hollow connecting tube is disposed entirely within said hollow plastic tube.

14. A splicing member as recited in claim 13, wherein:
    (a) said hollow plastic tube has first and second ends, said first end of said hollow plastic tube is heat sealed to said first wire section and said second end of said hollow plastic tube is heat sealed to said second wire section.

15. A splicing member as recited in claim 10, wherein:
    (a) said first wire section has at least one z-bend and at least one span; and,
    (b) said second wire section has at least one z-bend and at least one span.

16. An endless conveyor belt for conveying a food product from one point to another, comprising:
    (a) a plurality of interconnected wire segments forming a conveying surface to convey a food product from one point to another, said conveying surface having first and seconds ends and a plurality of openings;

(b) a splicing member for connecting said first end of said conveying surface to said second end of said conveying surface to form an endless conveyor belt;

(c) said splicing member including at least first and second wire sections, a hollow connecting tube and at least one sealing member, said hollow connecting tube having first and second ends, a portion of said first wire section being inserted into said first end of said hollow connecting tube forming a first exposed area, a portion of said second wire section being inserted into said second end of said hollow connecting tube forming a second exposed area; and, (d) said at least one sealing member being hollow and having first and second ends, said sealing member having a length greater than said hollow connecting tube, said hollow connecting tube being inserted into said sealing member, said first end of said sealing member being heat sealed to said first wire section adjacent said first exposed area to seal said first exposed area, said second end of said sealing member being heat sealed to said second wire section adjacent said second exposed area to seal said second exposed area.

17. An endless conveyor belt as recited in claim 16, wherein:

(a) said hollow connecting tube is formed from stainless steel.

18. An endless conveyor belt as recited in claim 16, wherein:

(a) said first and second wire segments include a first edge, a second edge, a plurality of z-bends and a plurality of spans, said plurality of z-bends and said plurality of spans being positioned between said first edge and said second edge.

19. An endless belt as recited in claim 18, wherein:

(a) said plurality of spans include a first span disposed adjacent said first edge and a second span disposed adjacent said second edge, said first and second spans are free from sealing elements.

20. An endless belt as recited in claim 19, wherein:

a) said plurality of spans further include at least one intermediate span positioned between said first and second spans, said sealing member being disposed on said intermediate span.

21. An endless conveyor belt, comprising:

(a) a plurality of interconnected segments forming a conveying surface to convey at least one article from one point to another, said conveying surface having first and seconds ends and a plurality of openings;

(b) a splicing member for connecting said first end of said conveying surface to said second end of said conveying surface to form an endless conveyor belt; and, (c) said splicing member including at least first and second sections, a connecting member and at least one sealing member, said connecting member having first and second ends, a portion of said first section being connected to said first end of said connecting member thereby forming a first exposed area, a portion of said second section being connected to said second end of said connecting member thereby forming a second exposed area, said at least one sealing member being deposed relative to said connecting member and said first and second sections to seal at least one of said first and second exposed areas.

* * * * *